United States Patent Office 3,371,750
Patented Mar. 5, 1968

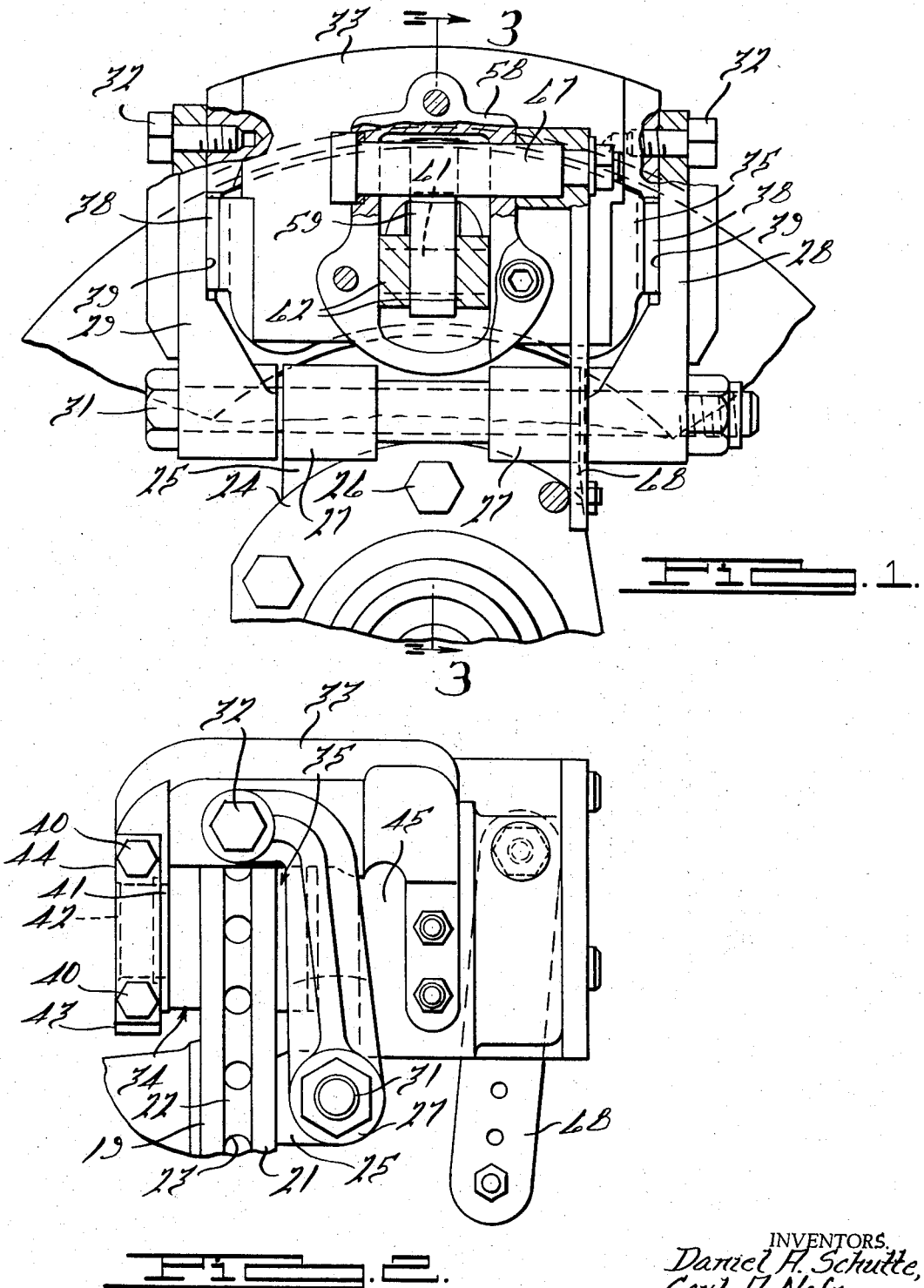

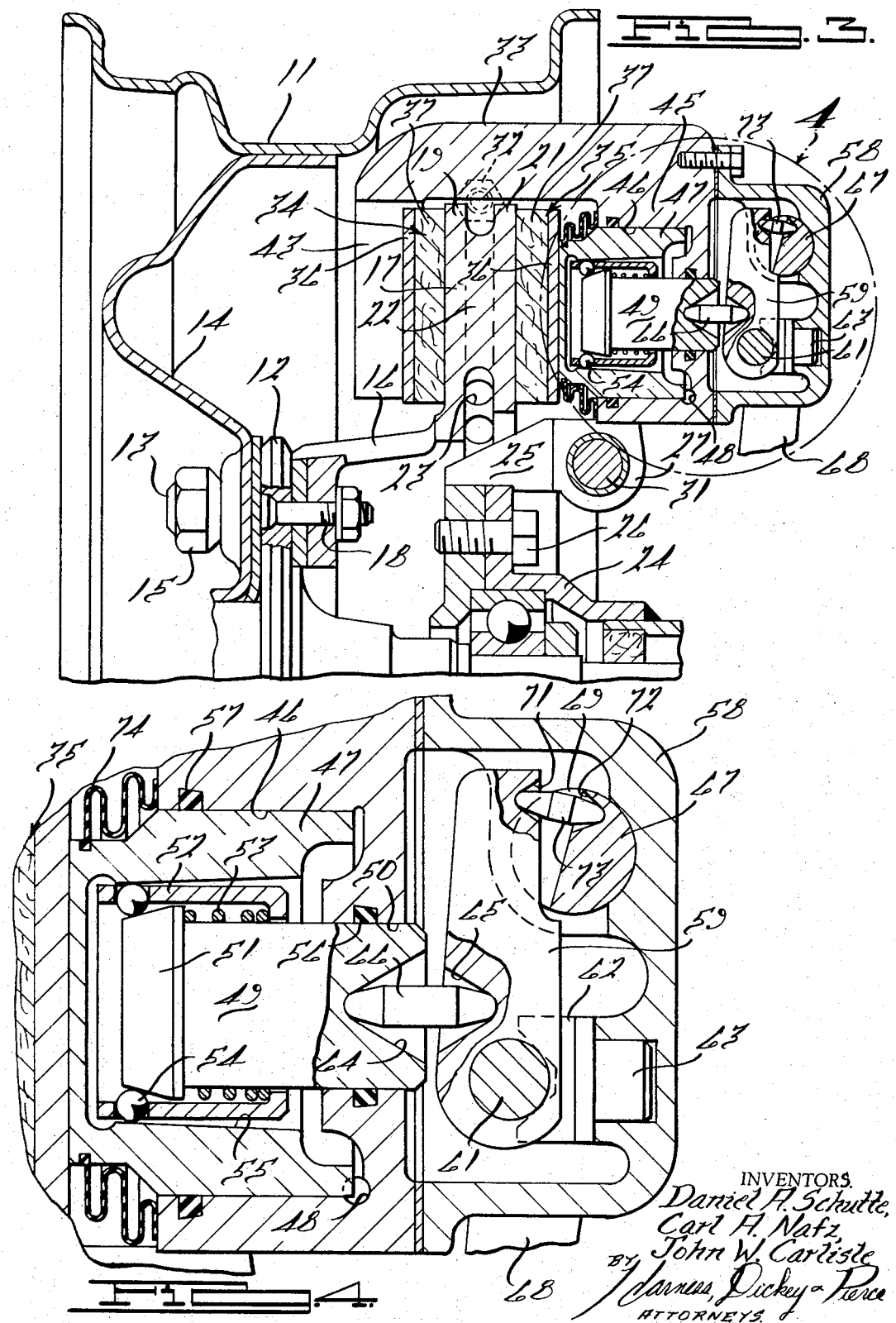

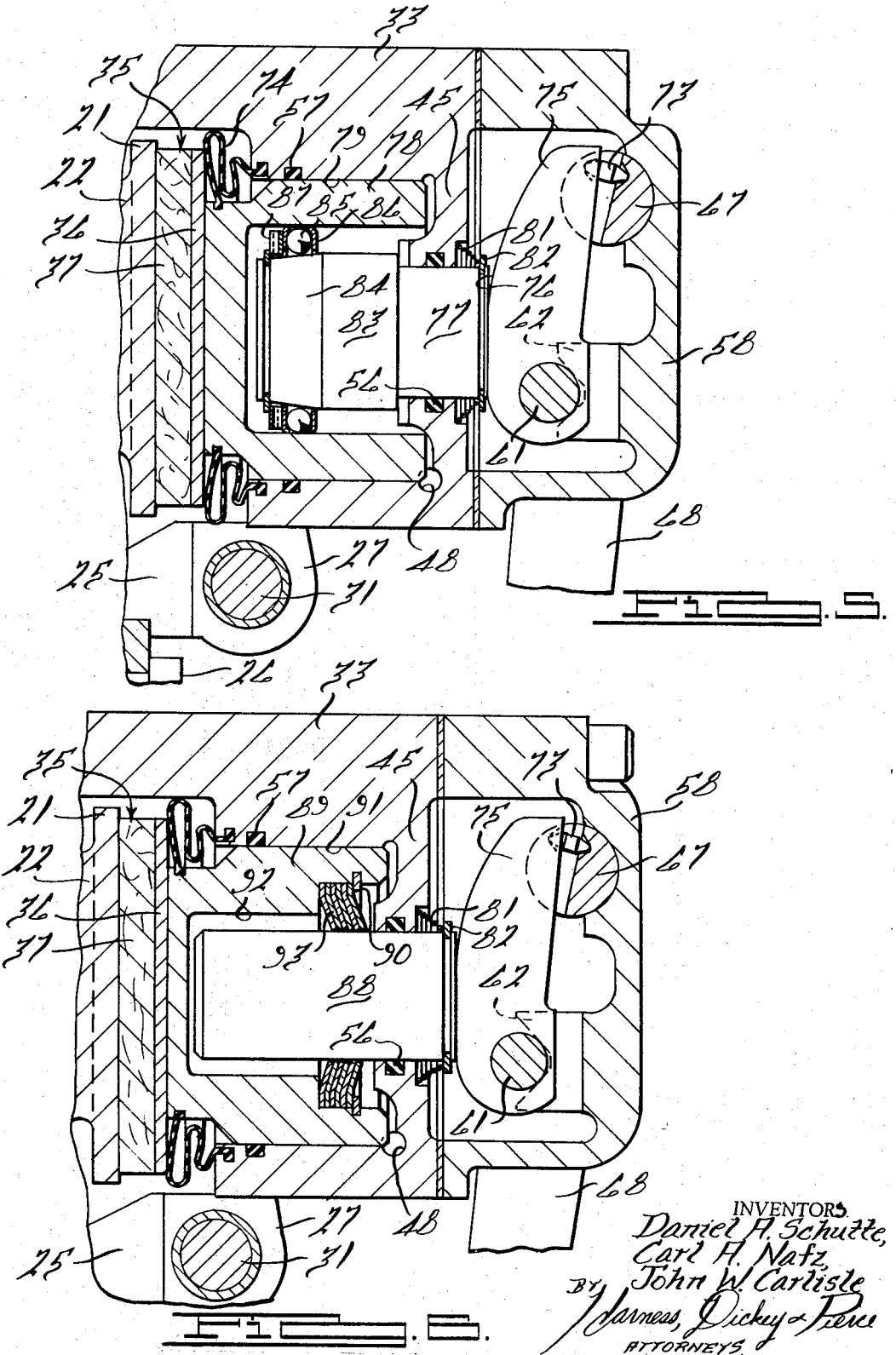

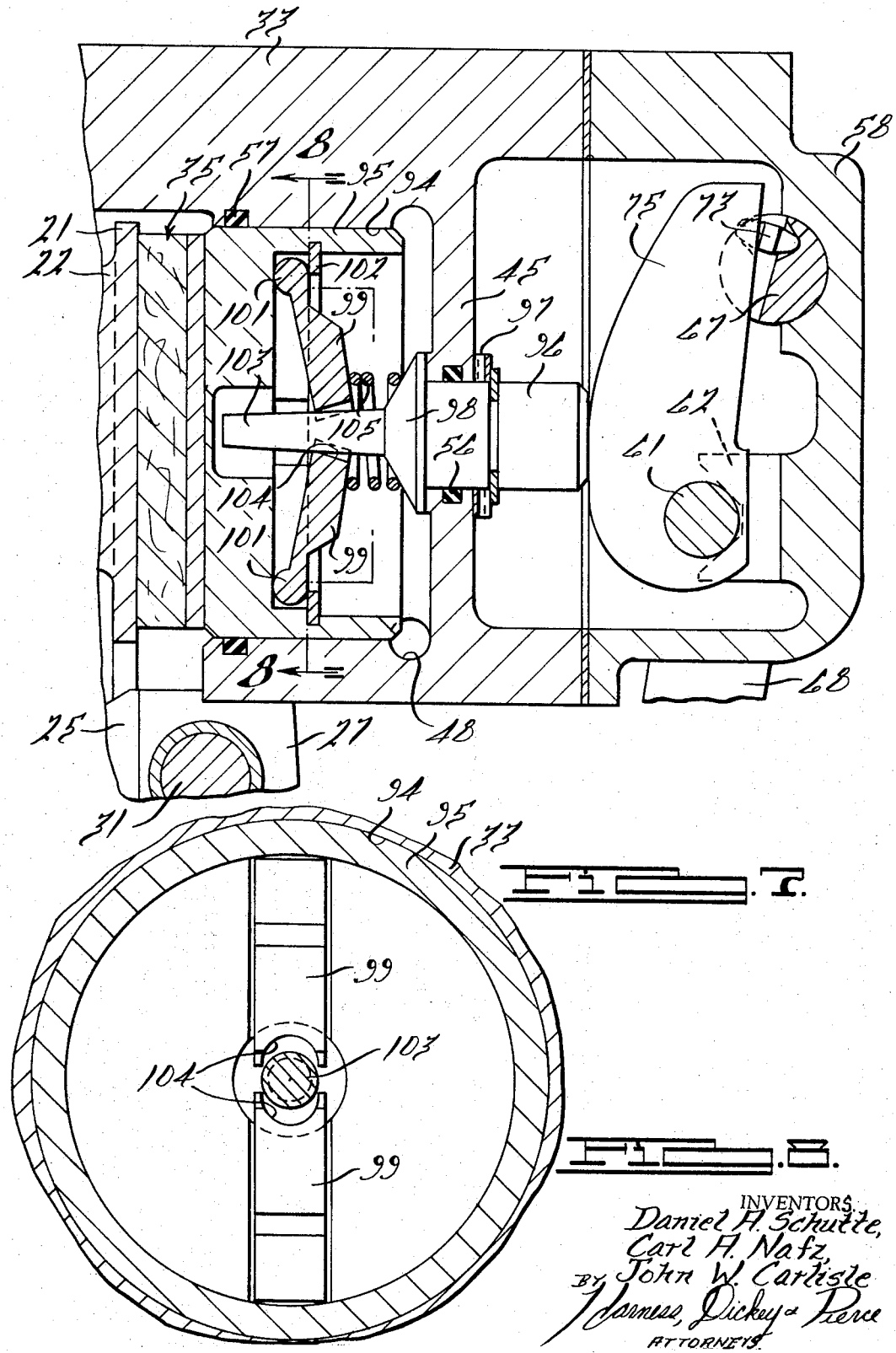

3,371,750
DISK BRAKE WITH AUTOMATICALLY ADJUSTED MECHANICAL ACTUATOR
Daniel A. Schutte, Carl A. Nafz, and John W. Carlisle, Springfield, Ohio, assignors to Kelsey-Hayes Company, a corporation of Delaware
Filed Aug. 22, 1966, Ser. No. 574,504
5 Claims. (Cl. 188—73)

ABSTRACT OF THE DISCLOSURE

A brake disk is straddled by the legs of a caliper which is pivotally mounted to shift laterally thereof. Brake pads on each side of the disk are moved thereagainst with light pressure when a piston and cylinder in one leg of the caliper engages one of the pads and moves it toward the disk. A plunger in the piston has locking means which limit the retraction of the cylinder and caliper to take up wear on the pads. The plunger is operated manually by a device supported on the pivoted caliper.

---

In the copending application of Harvey C. Swift, Ser. No. 572,931 filed Aug. 17, 1966, for Disk Brake With Automatic Adjuster, which was assigned to the assignee of the present invention, a disk brake structure is illustrated, described and claimed which is similar to that of the present invention.

In the present invention, a pair of legs of a caliper like element spans a brake disk, two brake pads and an operating piston and cylinder. The expansion of the cylinder and piston unit applies a direct force to one pad and a caliper leg which is moved in the opposite direction to simultaneously apply a force to the other pad. As the brake lining wears on the face of the brake disk, greater movement is required between the cylinder and piston. This undesirable feature has been overcome by the present invention when taking up any excess slack between the piston and the cylinder. This maintains the movement between the brake lining and disk surface to a minimum in all conditions of wear therebetween.

In the present arrangement, the caliper has extending legs between which the brake pads are mounted for engaging opposite faces of the disk brake. A piston is mounted within a cylinder for applying a pressure directly to one brake pad and to the adjacent leg of the caliper while the other leg is applying pressure to the other pad. The adjacent leg carries a pivoted lever connected to the remote end of a plunger within the piston actuated from a rotatable shaft containing a handle for applying a load to the brakes through the piston and cylinder. The arrangement is such that a pin within the piston elongates relative thereto as wear occurs to take up any play between the piston and cylinder which would otherwise occur. With such an arrangement all of the parts between the legs of the caliper are maintained in predetermined close relation to each other in a position to immediately apply the brake without lag which would occur if a greater space was present between the elements due to wear. All of the elements associated with the caliper are carried on a pivot to permit the caliper to center itself with the brake disk and have the brake pads disposed in parallel relation thereto.

Accordingly, the main objects of the invention are: to provide a caliper for straddling brake pads and pressure exerting means all of which are pivoted relative to a brake disk; to pivotally support the braking mechanism in a manner to permit the brake pads to adjust themselves in parallel relation to the faces of the brake disk; to progressively take up any play between the piston and cylinder during the braking operation caused by wear of the brake pads; to eliminate any substantial play between the brake pads and disk by means which limits the piston movement; to apply a braking force manually through the movement of the piston and cylinder by a hand operated lever, and in general to provide a braking mechanism for a brake disk which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken view with parts in section of a disk brake mechanism having pads which engage opposite faces of a brake disk;

FIG. 2 is a side view, in elevation, of the structure illustrated in FIG. 1;

FIG. 3 is a sectional view of the structure illustrated in FIG. 1, taken on the line 3—3 thereof;

FIG. 4 is an enlarged view of the structure illustrated in FIG. 3, taken within the circle thereof;

FIG. 5 is a view of structure, similar to that illustrated in FIG. 4, showing a further form of the invention;

FIG. 6 is a view of structure, similar to that illustrated in FIG. 5, showing another form which the invention may assume;

FIG. 7 is a view of structure, similar to that illustrated in FIG. 6, showing another form of the invention, and FIG. 8 is a sectional view of the structure illustrated in FIG. 7, taken on the line 8—8 thereof.

The brake mechanism of the present invention as shown in FIGS. 1 to 4 is associated with a vehicle wheel 11 secured to an axle flange 12 by a stud 13 over which the wheel spider 14 is disposed and clamped in position by a nut 15. The housing 16 for a brake disk 17 is also secured to the flange 12 by a plurality of bolt 18. The brake disk 17 has two washer-like walls 19 and 21 spaced by a web 22 which has a plurality of radially disposed ventilating passageways 23 extending therethrough. Secured to a fixed part 24 of the axle housing is a torque member 25 secured thereto by a plurality of screws 26. The torque member 25 has a pair of spaced bosses 27 which pivotally support arms 28 and 29 on a bolt 31 upon which the arms are hinged. The upper end of the arms are secured by screws 32 to the side of a caliper 33 at a point aligned with the web 22 between the walls 19 and 21 of the brake disk. With this arrangement the caliper 33 can move to the left and right when pivoting on the bolt 31 and can tilt angularly on the screws 32 so as to provide a flexible support for the mechanism and brake pads 34 and 35 provided on opposite sides of the brake disk.

Each brake pad 34 and 35 is provided with a backing plate 36 carrying friction lining 37 which engages the faces of the walls 19 and 21 of the friction disk. The brake pad 35 has extending flanges 38 at each side engaged in a slot 39 on the inner faces of the arms 28 and 29. The brake pad 34 as illustrated in FIG. 2 has a flange 41 at each end which engages within a slot 42 at each side of the leg 43 of the caliper 33, the slots being enclosed by plates 44 secured in position by screws 40. In this manner the brake pads 34 and 35 are movable relative to their supports so that they can adjust themselves to the surface of the disk walls 19 and 21. An inboard leg 45 of the caliper 33 contains a cylinder 46 having a piston 47 which engages the plate 36 of the brake pad 35. Applying pressure to the pad 35 between the legs 43 and 45 of the caliper 33 also applies an equal pressure to the pad 34 and on the two brake disks 19 and 21 to perform a braking operation. The fluid is admitted to the cylinder 46 through an orifice 48.

A wear takeup mechanism is provided within the piston 47 and embodies a plunger 49 having a truncated conical end section 51. A cage 52 extends over the plunger 49 and is urged away from the end sections 51 by a spring 53. The cage carries a plurality of balls 54 which are urged upwardly on the truncated conical section 55 by the spring 53 and cage 52. It will be noted that the wall of the aperture 55 is tapered but has less taper than that of the conical section 51. Annular seals 56 and 57 carried by the wall of the aperture 50 for the plunger 49 and the wall of the cylinder 46 for the piston 47 seal the plunger 49 and piston 47 within the cylinder.

Manual operable structure is provided within a housing 58 for manually operating the plunger 49 and the piston 47. A lever arm 59 is mounted on a shaft 61 secured in bosses in the nature of V-blocks 62, having a stub shaft 63 mounted in an aperture in the housing 58. Aligned recesses 64 and 65 in the plunger 49 and lever arm 59, respectively, receive the arcuate ends of a push rod 66. A shaft 67 is mounted in the housing 58 having a lever 68 thereon by which the shaft 67 is angularly adjusted. The end of the shaft 68 is cut away to provide a face 69 which mates with the upper end of the lever arm 59, the faces containing recesses 71 and 72, the bottoms of which are engaged by the spherical ends of a push rod 73. When the lever 68 is arcuately moved to the right as illustrated in FIGS. 3 and 4, the shaft 67 is rotated counterclockwise and moves the push rod 73 to the left rocking the lever arm 59 also to the left. This moves the push rod 66 and the plunger 49 to the left to thereby apply a force to the piston 47 and the brake shoe 35 which moves the caliper 33 to the right. This draws the leg 43 of the caliper 33 to the right to engage the brake pads 34. This shifting of caliper 33 applies equal pressure on the pads 34 and 35 which are free to adjust themselves flatly against the flat faces of the walls 19 and 21 of the brake disk 17.

When the plunger 49 is moved to the left, the balls 54 wedge between the truncated conical surface 51 and the conical surface 55 to have the piston and plunger operate in unison. When fluid is admitted to the cylinder 46, the piston 47 will be moved to the left and the plunger 49 will be moved to the right. If wear has occurred to the lining material of the brake shoes, separation will occur between the piston and plunger permitting the cage 52 to move to the right under the urge of the spring 53 to carry the balls further up the truncated conical surface 51 which will cause the piston 47 to take a new position relative to the plunger 49 to maintain the face of the piston closely adjacent to the shoe 35. The truncated conical surfaces 51, 55 and the balls 54 continuously reposition the piston 47 and plunger 49 relative to each other to prevent any play which would otherwise occur due to the wear of the brake pads from building up and as a result the brakes are properly adjusted at all times. It will be noted that a seal 74 protects the surface of the piston from dirt and grime.

A further form of the invention is illustrated in FIG. 5, wherein a lever arm 75 similar to the lever arm 59, has a cam face 76 which is disposed in engagement with the end of a plunger 77. The plunger is sealed to the opening in the leg 45 of the caliper 33 by the seal 56 and a piston 78 is sealed to a cylinder 79 by the seal 57. A spiral helical spring 81 urges the plunger 77 outwardly when engaging a split ring 82 secured to the end of the plunger. A body 83 on the inner end of the plunger 77 has a truncated conical surface 84 on its end engaged by a plurality of balls 85 carried in a cage 86. A corrugated washer-like spring 87 urges the cage 86 and ball 85 toward the right as viewed in FIG. 5. The entire mechanism is pivoted on the bolt 31 and when fluid is admitted into the cylinder 79 through the orifice 48, the movement of the piston 78 to the left will cause the legs 43 and 45 of the caliper 33 to move to the right to thereby clamp the brake pads 34 and 35 to the brake disk 17. Fluid within the cylinder pushing on the bottom of the plunger 83 causes it to move to the right, and if any play is present between the plunger and the piston, the spring 87 will urge the cage and balls to the right to take up any play between the piston and plunger. In this manner the wear occurring to the brake pads is taken up by the cage and ball arrangement between the piston 78 and cylinder 79 eliminating the play which would otherwise build up therebetween.

In FIG. 6 a similar type of structure to that of FIG. 5 is illustrated except that the plunger 88 is of cylindrical form being urged to the right by the spiral helical spring 81 having its outer end contacting the split ring 82. A piston 89 within a cylinder 91 of the leg 45 of the caliper 33 has a recess 92 for receiving the plunger 88. The recess is enlarged to receive a plurality of dish-shaped or Belleville-like washers 93 secured in position by a split ring 90. Any movement of the piston 89 to the left and the plunger 88 to the right will cause the washers 93 to lock the piston to the plunger in the greatest separated relation. In this manner when the piston 89 is moved to the left when fluid is introduced into the cylinder 91 through the orifice 48, the washers 93 will move to the left on the plunger 88 which is urged to the right by the fluid in the bottom of the aperture 92. Any relative movement between the piston 89 and plunger 88 will cause the washers to lock the piston and plunger in the new position. Any play which might otherwise occur in the system will be taken up by the piston and plunger. As the spring pads wear, the piston and plunger will be moved outwardly of each other and locked in the outermost position thereby preventing the buildup of play between the piston and the brake pads.

A still further form of the invention is illustrated in FIGS. 7 and 8 wherein the leg 45 of the caliper 33 carries a cylinder 94 containing a piston 95. The cylinder carries a plunger 96 which is urged outwardly against the cam surface of the lever arm 65 by a corrugated washer-like spring 97, the outward movement being limited by the head 98. A pair of collet arms 99 have their ends 101 pivotally secured in the hollow interior of the piston 95 by the split locking ring 102. The head 98 supports a tapered finger 103 between the arcuate walls 104 at the adjacent ends of the collet arms. The collet arms are urged downwardly into engagement with the tapered finger 103 by a coil spring 105 which engages the arms and the head 98. When the brake pads 34 and 35 are to be manually set by the rotation of the shaft 67, the cam 65 moves the plunger 96 to the left to have the tapered finger 103 thereof clamped by the end walls 104 of the collet arms 99 to cause the piston 95 to move to the left therewith. When oil is introduced into the cylinder 94 through the orifice 48, the piston 95 will be urged to the left while the plunger 96 and the finger 103 will be urged to the right so that if play is present the collet arms 99 will move to the left as the tapered finger 103 moves to the right. The piston 95 will be retained in its forward position without exerting any pressure upon the brake pad 35 when the pressure is released from the cylinder 94. In this manner any wear on the brake pads will be taken up by the adjustment of the piston 95 on the plunger 96 through the locking of the finger 103 by the collet arms 91.

Thus, in all of the forms of the invention, the manual adjustment of the brake occurs through the application of a force on the piston which shifts the caliper relative to the brake disk to apply the brake pads with equal force on opposite faces thereof. As wear occurs to the faces of the lining of the brake pads, a takeup device is provided between the fluid actuated piston and the plunger of the manual actuated device. These elements are moved in the opposite direction by the fluid within the cylinder and when moved apart due to the wear of the brake material, they will be locked together and retained in spaced apart relationship to each other. In this manner the objectionable slack and play due to the wear of the brake pads on the face of the brake disk is overcome by the takeup mechanisms hereinabove illustrated and described.

What is claimed is:

1. In a disk brake operating device, a caliper having legs, a brake disk having an edge section disposed between the legs of said caliper, a pair of brake pads movably supported one on each side of the brake disk adjacent to the legs, a cylinder in one leg of said caliper a piston within said cylinder in which fluid is admitted for applying a force between one brake pad and said one leg of the caliper for moving the caliper and the other leg against the other brake pad for forcing the pads toward each other and the brake disk, plunger means provided within the piston, locking means between the piston and plunger, for securing them against any substantial movement toward each other, embodying a truncated conical section on the plunger, a cage having a plurality of balls engaging the truncated conical section, spring means urging the cage to cause the balls to shift outwardly when moved to a greater diameter on the truncated conical section to thereby lock the plunger further outwardly of the piston each time they are moved outwardly of each other, and manual means supported on said caliper for urging the plunger toward the piston and the piston toward the brake disc to apply the brake pads thereto.

2. In a disk brake operating device as recited in claim 1, wherein spring means are provided for urging the plunger outwardly of the piston.

3. In a disk brake operating device as recited in claim 1, wherein said manual means embodies a cam element engaging said plunger, and a manual means for moving said cam element.

4. In a disk brake operating device as recited in claim 1, wherein the adjacent wall of the piston is also of truncated conical section.

5. In a disk brake operating device as recited in claim 1, wherein means are provided for sealing the piston and plunger against leakage of fluid within the cylinder.

References Cited

UNITED STATES PATENTS

| | | |
|---|---|---|
| 2,747,694 | 5/1956 | Helvern. |
| 2,946,408 | 7/1960 | Peras _____ 188—73 |
| 3,158,234 | 11/1964 | Henderson. |
| 3,244,260 | 4/1966 | Frayer. |

FOREIGN PATENTS

| | | |
|---|---|---|
| 1,161,770 | 1/1964 | Germany. |
| 120,306 | 12/1947 | Sweden. |

MILTON BUCHLER, *Primary Examiner.*

GEORGE HALVOSA, *Examiner.*